US012002330B2

(12) United States Patent
Davies

(10) Patent No.: US 12,002,330 B2
(45) **Date of Patent: *Jun. 4, 2024**

(54) GAMING SYSTEM WITH ELIMINATION FEATURE

(71) Applicant: Aristocrat Technologies Australia Pty Limited, North Ryde (AU)

(72) Inventor: Clive Evan Davies, Oatlands (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,561

(22) Filed: Apr. 27, 2023

(65) Prior Publication Data

US 2023/0267809 A1 Aug. 24, 2023

Related U.S. Application Data

(63) Continuation of application No. 17/522,352, filed on Nov. 9, 2021, now Pat. No. 11,670,137, which is a (Continued)

(30) Foreign Application Priority Data

Mar. 19, 2007 (AU) ................................ 2007901417

(51) Int. Cl.
*G07F 17/32* (2006.01)

(52) U.S. Cl.
CPC .......... *G07F 17/3276* (2013.01); *G07F 17/32* (2013.01); *G07F 17/3211* (2013.01); (Continued)

(58) Field of Classification Search
CPC .. G07F 17/3276; G07F 17/32; G07F 17/3211; G07F 17/3225; G07F 17/3258; G07F 17/3262; G07F 17/3267
See application file for complete search history.

(56) References Cited

U.S. PATENT DOCUMENTS 6,217,448 B1 4/2001 Olsen
6,575,834 B1 6/2003 Lindo
(Continued)

FOREIGN PATENT DOCUMENTS

AU 2017210569 8/2017

OTHER PUBLICATIONS

Examination report No. 1 for Australian patent Application No. 2017210569, dated Dec. 7, 2018.
(Continued)

*Primary Examiner* — Werner G Garner

(74) *Attorney, Agent, or Firm* — McAndrews, Held & Malloy, Ltd.

(57) ABSTRACT

A method is described for running a feature on a gaming system comprising a plurality of gaming consoles linked by a communication network. The method comprises running at least one elimination round of the feature. A set of participating gaming consoles are determined for the elimination round and a group of options is displayed on the participating gaming consoles. Selections of options from the group are entered by players at the participating gaming consoles and a winning option is displayed from the group of options. Consoles are eliminated from the set of participating consoles unless the winning option was selected at the respective console; and further elimination rounds are commenced unless termination criteria are met. A flashing sequence of lights and sounds may be exhibited to reveal the winning option.

20 Claims, 6 Drawing Sheets

Related U.S. Application Data continuation of application No. 16/439,427, filed on Jun. 12, 2019, now Pat. No. 11,183,024, which is a continuation of application No. 15/395,617, filed on Dec. 30, 2016, now Pat. No. 10,332,353, which is a continuation of application No. 12/050,553, filed on Mar. 18, 2008, now Pat. No. 9,536,393.

(52) U.S. Cl.
CPC ...... *G07F 17/3225* (2013.01); *G07F 17/3258* (2013.01); *G07F 17/3262* (2013.01); *G07F 17/3267* (2013.01)

(56) References Cited

U.S. PATENT DOCUMENTS

| | | | |
|---|---|---|---|
| 8,109,821 | B2 | 2/2012 | Kovacs |
| 2003/0125107 | A1 | 7/2003 | Cannon |
| 2003/0176215 | A1 | 9/2003 | Palmer |
| 2003/0236110 | A1 | 12/2003 | Beaulieu |
| 2004/0082384 | A1 | 4/2004 | Walker |
| 2004/0116174 | A1 | 6/2004 | Baerlocher |
| 2004/0248652 | A1 | 12/2004 | Massey |
| 2005/0028045 | A1 | 2/2005 | Kawaike |
| 2005/0277468 | A1 | 12/2005 | Fitzsimons |
| 2005/0282610 | A1 | 12/2005 | Palmer |
| 2006/0073877 | A1 | 4/2006 | Rodgers |
| 2006/0089196 | A1 | 4/2006 | Parham |
| 2007/0156443 | A1 | 7/2007 | Gurvey |
| 2007/0243936 | A1 | 10/2007 | Binenstock |
| 2008/0113765 | A1 | 5/2008 | DeWaal |
| 2008/0188277 | A1 | 8/2008 | Ritter |
| 2008/0248865 | A1 | 10/2008 | Tedesco |
| 2011/0197221 | A1 | 8/2011 | Rouse |
| 2014/0279540 | A1 | 9/2014 | Jackson |

OTHER PUBLICATIONS

Office Action dated Aug. 7, 2020 for U.S. Appl. No. 16/439,427 (pp. 1-22).
Office Action dated Feb. 8, 2021 for U.S. Appl. No. 16/439,427 (pp. 1-16).
Australian Examination Report No. 1 for App. No. AU2019275635, dated Feb. 2, 2021, 5 pages.
Office Action (Notice of Allowance and Fees Due (PTOL-85)) dated Jul. 23, 2021 for U.S. Appl. No. 16/439,427 (pp. 1-7).
Office Action (Non-Final Rejection) dated Sep. 22, 2022 for U.S. Appl. No. 17/522,352 (pp. 1-8).
Office Action (Notice of Allowance and Fees Due (PTOL-85)) dated Jan. 26, 2023 for U.S. Appl. No. 17/522,352 (pp. 1-8).
Australian Examination Report No. 1 issued in App. No. AU2022200688, dated Mar. 30, 2023, 3 pages.
Australian Examination Report No. 2 issued in App. No. AU2022200688, dated Mar. 27, 2024, 3 pages.

Replacement Sheet page 6/6
Gaming System With Elimination Feature
Inventor: Clive Evan Davies
Application No.: 12/030,553 Conf. No.: 8894
Attorney: LMJ Phone: 312-775-8000

GAMING SYSTEM WITH ELIMINATION FEATURE

RELATED APPLICATIONS

The present application is a continuation of U.S. patent application Ser. No. 17/522,352, filed Nov. 9, 2021, which claims priority to U.S. patent application Ser. No. 16/439,427, now U.S. Pat. No. 11,183,024, filed Jun. 12, 2019, which claims priority to U.S. patent application Ser. No. 15/395,617, now U.S. Pat. No. 10,332,353, filed Dec. 30, 2016, which claims priority to U.S. patent application Ser. No. 12/050,553, now U.S. Pat. No. 9,536,393, filed Mar. 18, 2008, which claims priority to Australian Provisional Patent Application No. 2007901417, having an international filing date of Mar. 19, 2007, entitled "Gaming System With Elimination Feature," all of which are hereby incorporated by reference in their entireties.

BACKGROUND

The present invention generally relates to gaming machines and methods of gaming. A particular embodiment of the present invention relates to a player-participation feature provided on a plurality of linked gaming machines.

With the increase of gambling at gaming venues has come increased competition between gaming venues to obtain a larger share of the total gambling spend. Gaming venue operators have therefore continuously looked for new variations and types of games to enhance the entertainment value of the games offered at the venues.

In response to this need, suppliers of gaming devices and systems have attempted to provide the sought after variety, while still developing games that comply with the relevant regulations in the jurisdiction of the gaming venue operator. Suppliers of gaming devices therefore are faced with restrictions on the types of games and gaming machines that are allowable, both in terms of the prevailing regulations and in terms of providing a return on investment to the gaming venue operators.

SUMMARY

According to a first aspect of the invention, there is provided a method of running a feature on a gaming system comprising a plurality of gaming consoles linked by a communication network, wherein the method comprises running at least one elimination round of the feature, each elimination round comprising: determining a set of participating gaming consoles for the elimination round; displaying a group of options on the participating gaming consoles; receiving selections of options from the group entered by players at the participating gaming consoles; choosing a winning option amongst the group of options; eliminating consoles from the set of participating consoles unless the winning option was selected at the respective console; and commencing a further elimination round unless termination criteria are met.

Each elimination round may comprise displaying a flashing sequence that slows down to reveal the winning option.

The plurality of gaming consoles may be a subset of a larger group of gaming consoles and the method comprises designating the plurality of gaming consoles as an initial set of participating machines.

The method may comprise deducting an entry fee for selections entered by the players.

Each choice may have an associated entry fee.

The entry fees may be deducted from credits accumulated by the players during normal game play at the gaming consoles.

The termination criteria may include at least one of: whether a permissible maximum number of elimination rounds have been completed; whether the set of participating consoles contains zero consoles; and whether the set of participating consoles contains a single console.

The method may comprise awarding a prize to one or more players at gaming consoles still in the set of participating consoles when the termination criteria are met.

The method may comprise awarding a prize to one or more players selected at random from players still participating when the termination criteria are met.

The method may comprise accumulating entry fees into a jackpot, the prize being drawn from the jackpot.

The group of options may consist of two or more colours.

The colours in the group may correspond to colours displayed in the flashing sequence.

The winning option may be chosen randomly.

The method may comprise accepting an input that specifies the winning option.

According to further aspects, the invention broadly resides in instructions executable by a game controller to implement the method as described in the immediately preceding paragraphs and to such instructions when stored in a storage medium readable by the game controller. The invention also relates to a gaming system that implements the methods described above.

Further aspects of the present invention will become apparent from the following description, given by way of example only and with reference to the accompanying drawings.

BRIEF DESCRIPTION OF THE DRAWINGS

Certain embodiments will now be described to illustrate the invention in relation to the accompanying drawings, in which:

FIG. 8 shows an example of a graphic user interface used to specify feature parameters in the method of FIG. 5.

DETAILED DESCRIPTION

A promotional feature for a system of gaming machines is described in which eligible players make selections in one or more elimination rounds.

Operating Environment

Figure 1:
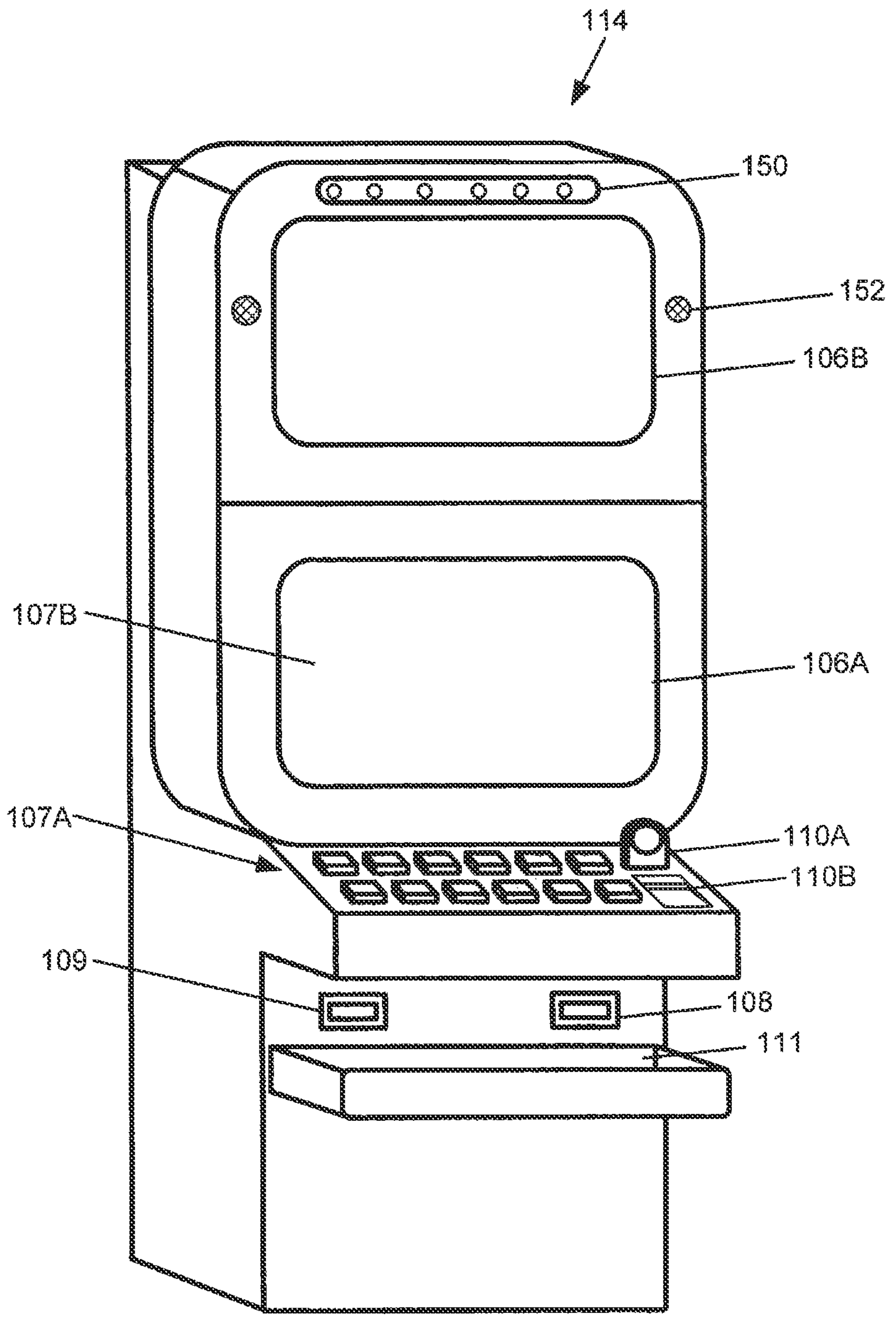
FIG. 1 shows a view of a gaming console suitable for implementing certain embodiments of the present invention.

In FIG. 1 of the accompanying drawings, one example of a gaming console that is suitable to implement certain embodiments of the present invention is generally referenced by arrow 114.

The gaming console 114 includes two displays 106A, 106B on one or both of which is displayed representations of a game that can be played by a player and a bank of buttons 107A and/or a touch screen 107B to enable a player to play the game. The displays 106 may be video display units, such as a cathode ray tube screen device, a liquid crystal display, plasma screen, any other suitable video display unit, or the visible portion of an electromechanical device. The display 106B may display artwork, including for example, pay tables and details of bonus awards and other information or images relating to the game. In alternative gaming consoles the display 106B may be omitted, optionally replaced by a static display.

A credit input including a coin input 110A and/or bill collector 110B allows a player to provide credit for wagering and a coin output 111 is provided for cash payouts from the gaming console 114. A card and/or ticket reader 108 and a printer 109 may be provided to provide player tracking, cashless game play or other gaming and non-gaming related functions.

The gaming console 114 also includes one or more speakers and/or buzzers 152. The speakers 152 may be used to convey audible information to a player at the gaming console 114. In addition the speakers and buzzers 152 may be used to play music to attract attention or to accompany the gaming feature presented on the gaming console 114. In addition to the displays 106, the gaming console 114 may include one or more illumination devices such as light-emitting diodes (LEDs) 150 or electro-fluorescent signage. FIG. 1 shows one possible configuration of a sequence 150 of LEDs. The illumination devices include devices of different colour. The lights may flash and run in chaser sequences around the gaming console 114. The illumination devices may be individually controllable.

Figure 2:
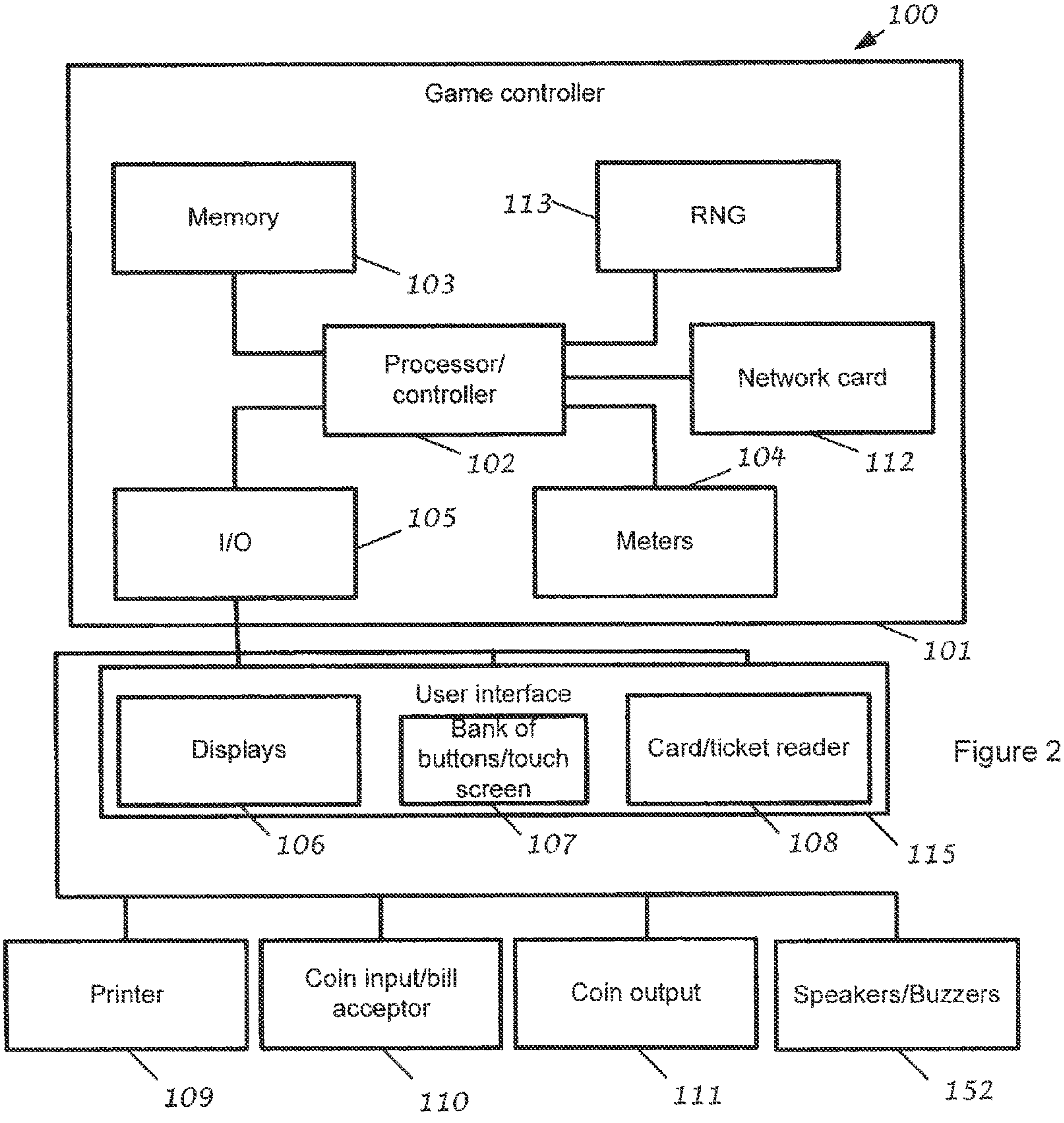
FIG. 2 shows a block diagram of a gaming machine suitable for implementing certain embodiments of the present invention.

FIG. 2 shows a block diagram of a gaming machine, generally referenced by arrow 100, suitable for implementing certain embodiments of the present invention. The gaming machine 100 may include the gaming console 114 shown in FIG. 1 and accordingly like reference numerals have been used to describe like components in FIGS. 1 and 2.

The gaming machine 100 includes a game controller 101, which in the illustrated example includes a computational device 102, which may be a microprocessor, microcontroller, programmable logic device or other suitable device. Instructions and data to control operation of the computational device 102 are stored in a memory 103, which is in data communication with, or forms part of, the computational device 102. Typically, the gaming machine 100 will include both volatile and non-volatile memory and more than one of each type of memory, with such memories being collectively represented by the memory 103. The instructions to cause the game controller 101 to implement the present invention may be stored in the memory 103. The instructions and data may be conveyed to the gaming machine by means of a data signal in a transmission channel. Examples of such transmission channels include network connections, the Internet or an intranet and wireless communication channels.

The game controller 101 may include hardware credit meters 104 for the purposes of regulatory compliance and also include an input/output (I/O) interface 105 for communicating with the peripheral devices of the gaming machine 100. The input/output interface 105 and/or the peripheral devices may be intelligent devices with their own memory for instructions and data.

In the example shown in FIG. 2, the peripheral devices that communicate with the controller are the displays 106, bank of buttons/touch screen 107, the card and/or ticket reader 108, the printer 109, a bill acceptor and/or coin input 110 and a coin output 111.

The peripheral device may include one or more speakers and/or buzzers 152 that are in data communication with gaming controller 101 via an input/output unit such as I/O 105. Consequently, the audio information provided on the buzzers and/or speakers may be controlled by software running on the game controller 101. In addition, where the gaming machine 100 includes other illumination means such as banks of LEDs 150, such illumination may be switched on or off by instructions transmitted from the game controller 101.

Additional devices may be included as part of the gaming machine 100, or devices omitted as required for the specific implementation.

The bank of buttons 107A and/or touch screen 107B together with one or both of the displays 106 may provide a user interface 115 through which the gaming machine 100 and player communicate. If a card/ticket reader 108 is provided, this may also form part of the user interface 115.

In addition, the gaming machine 100 may include a communications interface, for example a network card 112. The network card 112, may for example, send status information, accounting information or other information to a central controller, server or database and receive data or commands from a the central controller, server or database. The network card 112 may also enable communication with a central player account, allowing cashless gaming. One or more of the peripheral devices, for example the card/ticket reader 108 may be able to communicate directly with the network card 112. The network card 112 and the I/O interface 105 may be suitably implemented as a single machine communications interface.

The game controller 101 may also include a random number generator 113, which generates a series of random numbers that determine the outcome of a series of random game events played as part of a game on the gaming machine 100.

The game controller 101 may have distributed hardware and software components that communicate with each other directly or through a network or other communication channel. In particular, the game controller 101 may be located in part or in its entirety remote from the user interface 115. Also, the computational device 102 may comprise a plurality of devices, which may be local or remote from each other. Instructions and data for controlling the operation of the user interface 115 may be conveyed to the user interface 115 by means of a data signal in a transmission channel. The user interface 115 may be a computational device, for example a hand-held terminal or personal computer, used by a person to play a game provided from a remote game controller 101.

Figure 3:
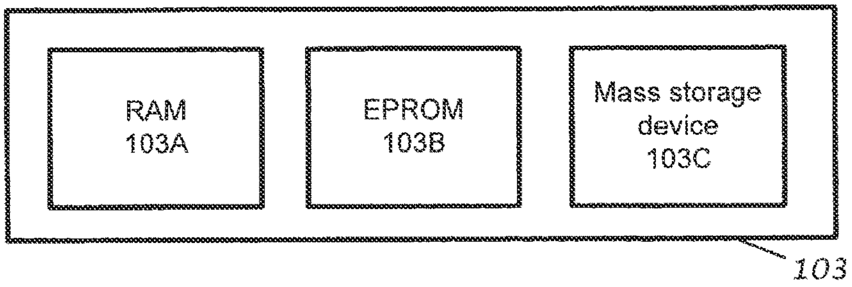
FIG. 3 shows a block diagram of components of the memory of the gaming machine represented in FIG. 2.

FIG. 3 shows an exemplary block diagram of the main components of the memory 103. The RAM 103A typically temporarily holds instructions and data related to the execution of game programs and communication functions performed by the computational controller 102. The EPROM 103B may be a boot ROM device and/or may contain system and game related code. The mass storage device 103C may be used to store game programs, the integrity of which may be verified and/or authenticated by the computational controller 102 using protected code from the EPROM 103B or elsewhere.

Figure 4:
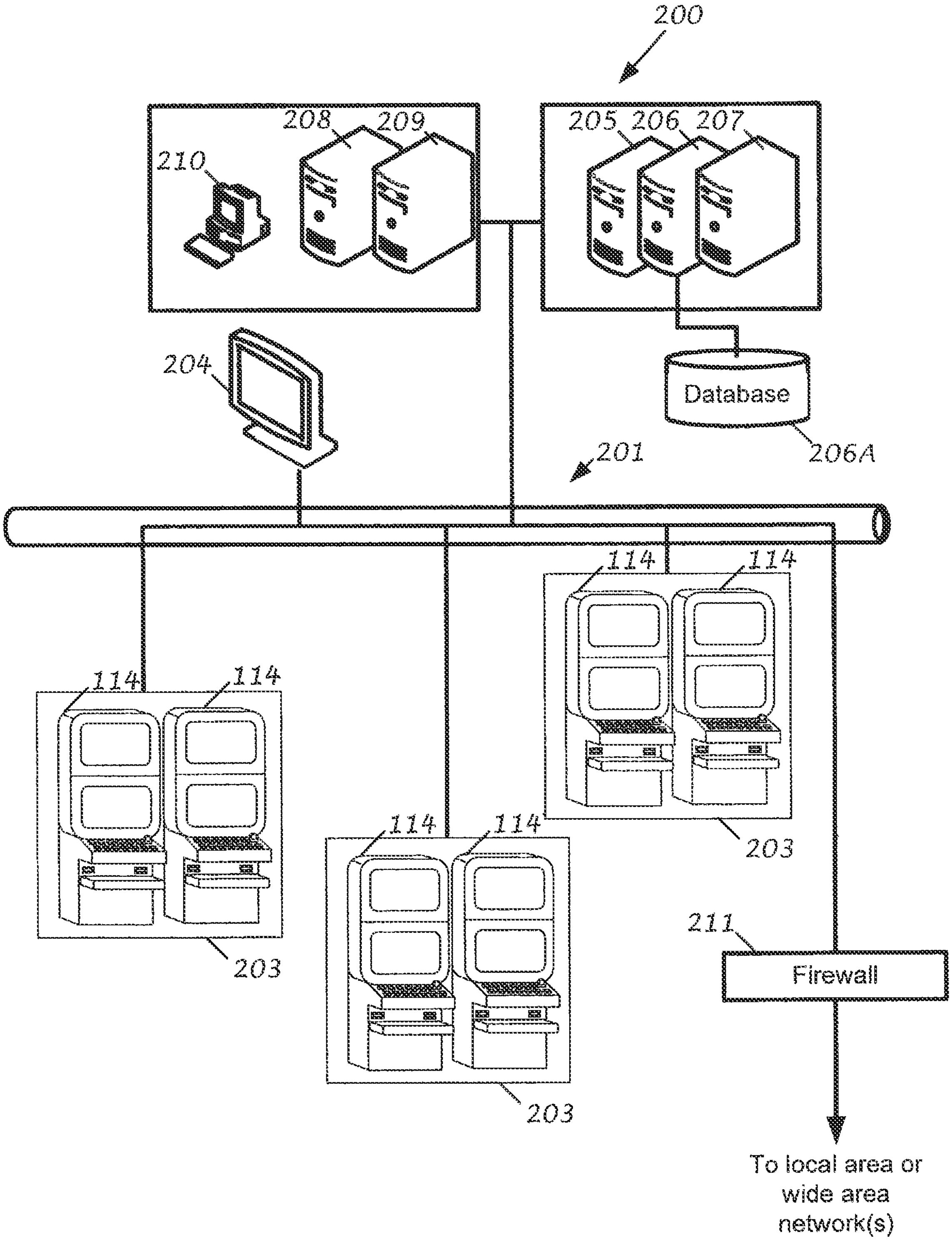
FIG. 4 shows schematically a network gaming system suitable for implementing certain embodiments of the present invention.

FIG. 4 shows a gaming system 200 in the form of a network of devices. The gaming system 200 includes a network infrastructure 201, which for example may be an Ethernet network. Alternatively, a wireless network and/or direct communication channels, or a different type of network may be used to link the gaming machines to a server, each other and/or other devices. Gaming consoles 114, shown arranged in three banks 203 of two gaming consoles 114 in FIG. 4, are connected to the network infrastructure 201. The gaming consoles 114 may form part or all of a gaming machine 100. Single gaming consoles 114 and banks 203 containing three or more gaming devices 202 may also be connected to the network infrastructure 201, which may also include hubs, routers, bridges to other networks and other devices (not shown).

One or more displays 204 may also be connected to the network 201. The displays 204 may, for example, be associated with a bank 203 of gaming consoles 114. The displays 204 may be used to display representations associated with game play on the gaming devices 202, and/or used to display other representations, for example promotional or informational material.

Servers may also be connected to the network 201. For example, a game server 205 may generate game outcomes for games played on one or more of the gaming consoles 114, a database management server 206 may manage the storage of game programs and associated data in a database 206A so that they are available for downloading to, or access by, game controllers 101, and a jackpot server 207 may control one or more jackpots for the gaming system 200.

Further servers may be provided to assist in the administration of the gaming system 200, including for example a gaming floor management server 208, and a licensing server 209 to monitor the use of licenses to particular games. An administrator terminal 210 is provided to allow an administrator to manage the network 201 and the devices connected to the network.

The gaming system 200 may communicate with other gaming systems, other local networks, for example a corporate network and/or a wide area network such as the Internet through a firewall 211.

Setting Up the Promotional Feature

Figure 5:
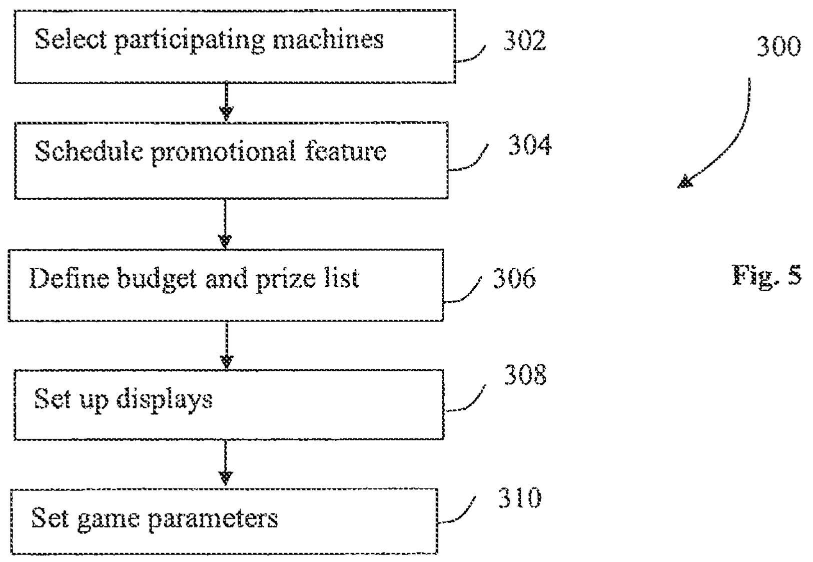
FIG. 5 shows a flow diagram of a method of setting up a promotional feature on a system of gaming machines.

FIG. 5 illustrates a method 300 of setting up the promotional feature. The steps of method 300 will be typically implemented by software running on one or more servers in the gaming system 200. A user interface is provided on a terminal such as administrator terminal 210 that enables the user to enter the desired parameters of the feature. The user may enter a new feature starting from scratch. Alternatively, the user may retrieve the parameters of an existing feature and edit the existing parameters in order to set up a new promotional feature.

In step 302, the set-up software provides an interface that enables a user to select a group of specific gaming machines 114 to participate in the promotional feature. The participating machines may include multiple device types, including for example poker machines, cash registers, entrance machines, blackjack tables, roulette, poker machines, keno terminals and sports book terminals. A radio button may allow for the inclusion of multiple device types into any one promotional event. Each device type can be further defined into groups and sub-groups. By presetting the group associations in database applications relating to the machines, it is possible to assign a promotional event to many different combinations of networked devices.

In step 304, software running on the administration terminal 210 provides the user an interface for determining one or more time periods in which the promotional feature will operate on the selected group of gaming machines 114. A calendar selection may be provided to allow the user to define a start and end date for the promotional event. Within the specified calendar period, the user is able to define specific time periods. For example, the user may specify that in a specified calendar period the promotion is to run each Monday between 10 am and midday and again on Mondays from 2 pm to 4 pm.

In step 306 software running on administrator terminal 210 enables the user to define a budget and, optionally, a prize list for the event. Although the options of setting a specific budget and prize list are offered to the user in step 306, the promotional feature described may also run successfully without a budget of its own. Instead, the event can use a jackpot built up from any existing unit of accumulation on the gaming system 200, such as points earned for normal poker machine play.

The budget option allows the actual costs of the event to be entered into the system. These costs include the full cost budget for the entire promotional period, as well as the actual expenditure including staff costs and prize value of items on the prize list, if used. Where an overall budget is set, the software determines the actual number of promotional sessions within the commercial period and calculates the amount of money that can be spent in each session in order to stay within the overall budget. The software also enables the user to estimate the anticipated staff costs of running the promotional feature.

If additional prizes are included as a reward in the promotional feature, in step 306 the user is able to specify a list of prizes to be offered. Where prizes are offered in addition to a jackpot of credits, the interface software allows the user to specify a 32-character description of the prizes. This description may, for example, be used to describe the prize on offer on network display screens that each show two lines of 16 characters. A detailed description may also be used to describe the prize on other network signage such as display 204. The software may also allow the user to specify a final collection date before which the item must be collected by the player. The set-up software also enables the user to provide a photograph of an item in the prize list. A photograph may be provided, for example, either from a computer file or directly from a digital camera. The image of the prize may be displayed in the course of the promotional feature on displays 204 or on the displays of the individual gaming consoles 114.

In step 308 the user is provided with an interface to design screens for display associated with the promotional feature. For example, advertising and marketing material may be displayed prior to the promotion, or during the promotion. The interface display prompts the user by indicating the different types of screens that should be designed before the promotional feature is run. The message types may include:

"session pending" messages;

"event in progress" messages;

"current prize on offer" messages; and

"winner" messages.

In addition, the elimination game offered in the promotional feature requires the users to make a selection from a range of options. In one implementation the selection is made between a number of colours. For example, the user may choose between red, yellow and green options. The user configuring the promotional feature sets up a message to prompt players to choose their colours.

The available formats for each of the messages may depend on the type of participating machines selected in step 302. For example, a more elaborate message may be designed for display on a plasma screen than would be appropriate for other types of screen such as a two line×16 character LCD screen. The user may also determine sound and light sequences to accompanying messages. The results of the graphic design are displayed to the user at the administrator terminal 210 so that the user can see the finished effect of the design. The user interface may display a selection of pre-made graphics for the user to specify as background images on the displays. A selection of text themes may also be displayed to provide a variety of colour, size and formatting display options. Various animation options may also be displayed for presentation of the text content of the message.

In some arrangements players of the gaming consoles 114 may be provided with individual cards that contain, for example, information identifying the player or details of accumulated credits. For such systems, the user in step 308 is provided with the option of designing messages associated with the insertion or removal of the individuals' cards. For example, when a new card is inserted into a gaming console 114, a welcome message may be presented to the player together with information about how the promotional feature functions. Associated messages may describe the current prize on offer and give information about the player's current status. Similarly when a card is removed a goodbye message may be displayed and, if appropriate, a message for the user to collect a prize. The content and design of these messages may be set up by the user in step 308.

As the promotional feature described herein involves one or more rounds of an elimination game, the user configuring the feature also needs to set up display screens that indicate the status of the player in the elimination game. Such messages may, for example, indicate that a player has been eliminated in a current round. Other messages indicate that the player has been successful and is progressing to the following round.

In step 310, the software running on administrator terminal 210 offers the user various options for setting up the parameters of the elimination game. An example of a graphic user interface 600 that may be displayed on the administrator terminal 210 is shown in FIG. 8.

One parameter 614 determines whether the reward in the promotional feature includes:

promotional credits;

prizes from a prize list; or prizes and promotional credits.

In one arrangement players participating in the promotional feature make a selection between 3 different colours 602, 604, 606. Each of the colours has two parameters that may be set up in step 310. One parameter 608 determines the cost for a player to purchase the colour. The field 608 determines how many points will be deducted from a player's account and added to the jackpot total for each round of the game. The second parameter 610 associated with the colour specifies the probability of the promotional feature selecting the colour to win. In one example, the game involves a choice between red, green and yellow. The user may specify that each choice of colour will cost a player 50 points. In the example, red 602 is given a 20% probability of winning, while green 604 and yellow 606 are each given a probability of 40% of being the winning colour.

In order to enhance the entertainment value of the game and to indicate to players that a colour selection is currently in process, a flash sequence is specified. In the flash sequence, the speakers, buzzers, displays and flashing illumination means of the participating devices are caused to flash and beep so as to cause noticeable movement. After a period, the flashing will begin to gradually slow down until the progress of the lights and sound can be easily followed, ultimately stopping on indications of one colour. Parameters 612 set up in step 310 determine aspects of the flash sequence that will be used in the course of the elimination game. A flash time may be specified, being the number of seconds that the flash sequence flashes around the gaming room before beginning to slow down. A flash speed parameter determines how fast the flash sequence moves around the room or around a series of lights on a gaming console. A flash decay parameter determines how the sequence slows down as it moves towards to a winning colour. A flash sound parameter enables the user to specify sounds to accompany the flash sequence.

In one arrangement, the flash sequence may move through a spatial sequence of gaming consoles. Such an arrangement gives players the impression of simulated movement through the gaming room. Display messages may also be designed to inform players, either on displays 106 or displays 204, the winning outcome of the flash sequence.

Running the Promotional Feature

Figure 7:
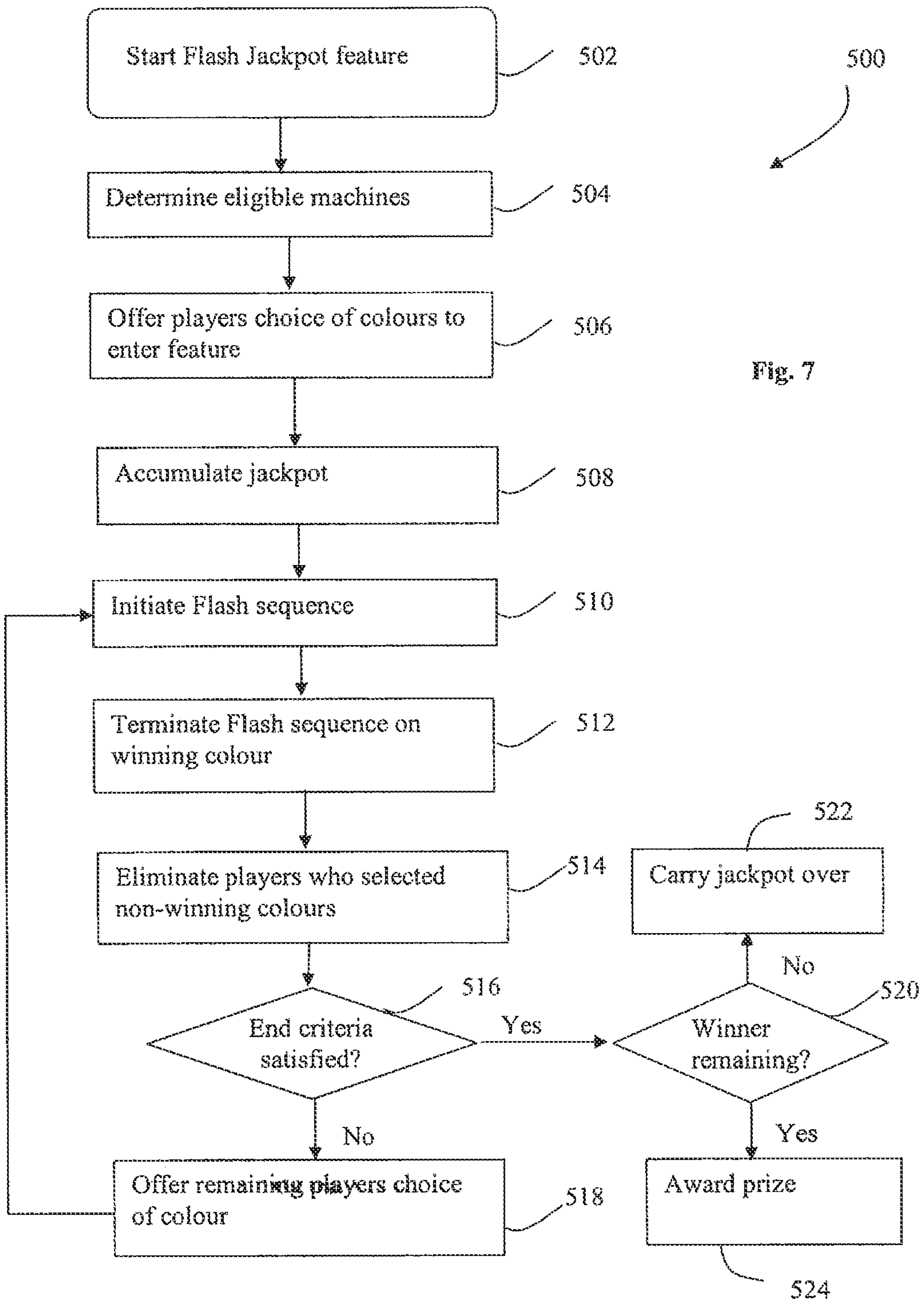
FIG. 7 shows a flow diagram of a method of running the promotional feature on a system of gaming machines.
Figure 6:
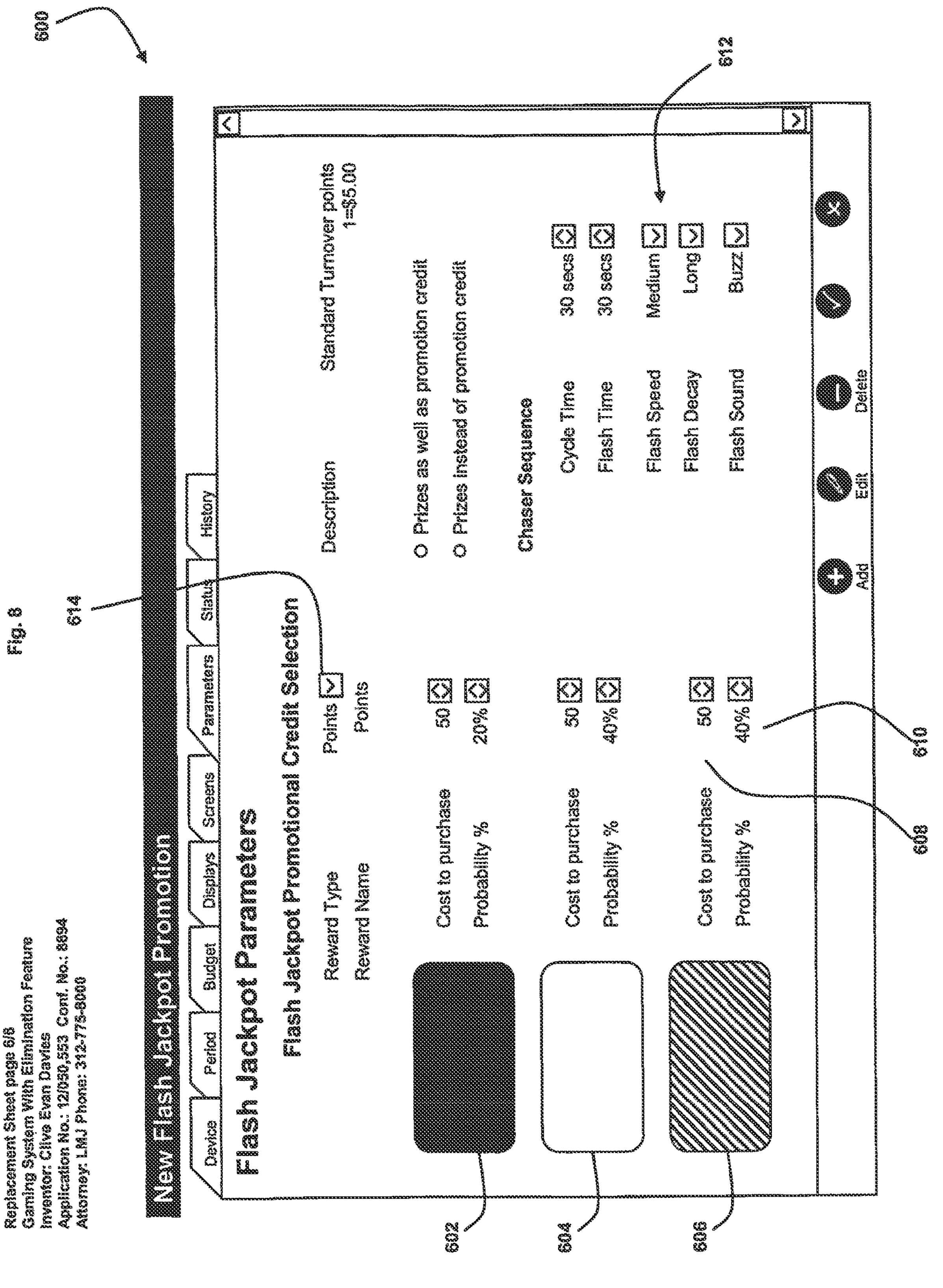

FIG. 7 illustrates a method 500 of running the promotional feature on a gaming system 200. The gaming feature is typically conducted by software running on one or more servers attached to the network infrastructure 201, for example game server 205. Distributed software may also be used, for example making use of computational devices 102 within one or more of the gaming consoles 114.

In step 502 the promotional feature commences in accordance with the schedule specified by the user in step 304 of method 300. In step 504 the machines eligible for participation in the flash jackpot feature are designated in accordance with the selection made in step 302. Prior to the flash jackpot feature commencing, messages alerting players to the forthcoming feature may be displayed, for example on displays 204 or the individual displays of the gaming consoles 114.

In step 506 the participating machines display messages that offer players a choice of colours to enter the flash jackpot feature. There is an entry fee for each colour. The entry fee may be paid from credits accumulated by the players in normal game play on the gaming consoles 114.

In step 508 the entry fees are accumulated towards a jackpot. A waiting period is specified between the start of the flash jackpot feature and the initiation of the flash sequence. During this wait time, players are able to make their choice of colour. A countdown timer and/or audible messages may indicate to players how much time remains before the flash sequence will commence.

In step 510 the flash sequence is initiated. The coordination software may initiate the flash sequence automatically when pre-specified criteria are satisfied. In one arrangement the criterion is whether a specified time has elapsed following the start of the feature. In one alternative arrangement the flash sequence is initiated when the jackpot reaches a threshold value.

As mentioned above, various formats of flash sequence may be used. The general intention is to provide an exhibition involving some light, sound and movement to make the players aware that a selection is in process and to delay for a time the revelation of the winning outcome. Combinations of sounds from speakers and buzzers and light from flashing LEDs and displayed messages and graphics may form part of the flash sequence. The flash sequence may also be perceived to move from gaming console to gaming console around the gaming room.

In step 502 the flash sequence terminates on a winning colour. The winning colour is selected randomly in accordance with the probabilities specified in step 310. In different arrangements, the actual random selection may be performed at different stages of the method 500. For example, the winning colour may be selected before the flash sequence is commenced, or during the flash sequence.

In step 514 the coordinating software identifies those players who selected non-winning colours. These players are eliminated from the promotional feature. Messages are displayed on the individual displays to inform players whether they have been eliminated or whether they are progressing to a further round.

In step 516 the coordinating software checks whether end criteria for the elimination feature have been satisfied. For example, if all players have been eliminated, the current feature may end. Alternatively, there may be a maximum permissible number of elimination rounds before the game ends.

If the end criteria are not satisfied, then the game progresses to the next elimination round. In step 518 players remaining in the elimination game are offered a further choice of colours. In one arrangement the players pay a further entry fee in order to select a colour in the further elimination rounds. Alternatively, players who have survived a previous elimination round may be able to select a new colour without paying a further fee. In some arrangements, the winning probabilities may be adjusted for later elimination rounds so that a colour does not always have the same probability of success. Following step 518, process control returns to step 510, in which the next flash sequence is initiated.

Once the end criteria are satisfied (the Yes option of step 516) process flow proceeds to step 520, in which the coordinating software checks whether there is any winner remaining. If so, then in 524 the jackpot is awarded to the winner or winners. If there is no winner, then in step 522 the jackpot is saved and carried over for a later flash jackpot feature. If there are several winners, the coordinating software may randomly select one or more winners from the remaining players.

In one alternative, the flash jackpot feature is adjusted to ensure that there is always at least one winner. For example, the coordinating software may ensure that all of the colours on offer have been selected before a flash sequence starts. Thus, for example, if no player has yet selected red, the coordinating software may limit the choice available to subsequently entering players to ensure that red is chosen.

It will be appreciated that the described example using three colours may be varied in different implementations. For example, a different number of colours may be offered in a game. Preferably, the colours on offer match the range of colours available in the illumination means on the participating gaming consoles 114. In this way, the flash sequence can cycle between the colours on offer. Alternatively, the choice may be between different graphic objects, for example different types of fruit or suits of cards.

In other arrangements, the flash sequence may not occur on the individual gaming consoles 114, but may take place in a separate unit that is visible to the participating players and presents some entertaining features to engage the attention of players during the flash sequence. There are also various ways in which players at gaming consoles 114 may accumulate promotional credits to use in entering the flash jackpot feature. Players may be awarded a start-up amount of promotional credit at the beginning of a session or, for example, when a card is issued to a player. Players may also accumulate promotional credits in the course of normal game play on gaming consoles 114. For example, players may be awarded promotional credits for each dollar spent at the gaming consoles 114 and/or for each dollar won at the gaming consoles 114.

Arrangement with Manual Override

The method described with respect to FIG. 7 is operated by coordinating software running on the gaming system 200. In a further arrangement, provision is made for the intervention of a compere or host. The host may help identify winners and encourage participation in the game. During the course of the promotional feature, the host is provided with access to a display connected to a network infrastructure 201. A status screen is shown on the display to indicate the progress of the feature. The status screen informs the host of the current accumulated jackpot total. The status screen also shows the total number of machines in use and the total number of user cards in use in the allocated promotion area. The status screen also displays the wait time remaining until the system is due to commence the next flash sequence.

Another field on the status screen indicates which round of the elimination game is currently being played.

Figure 6:
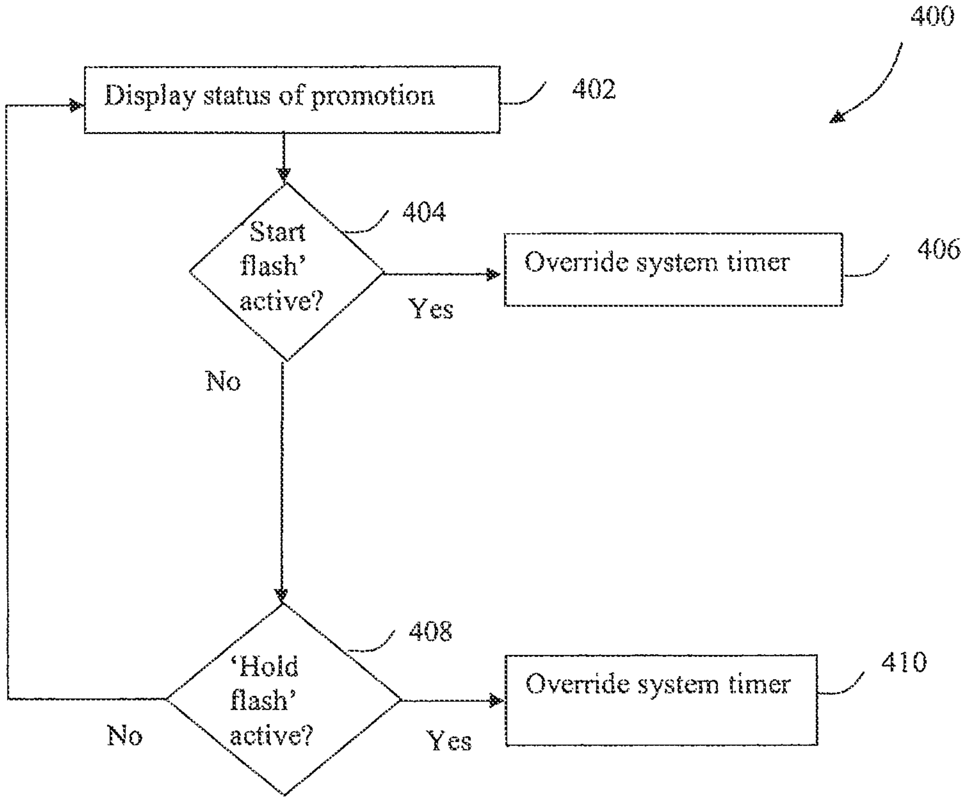
FIG. 6 shows a flow diagram of a version of the feature having manual override functions.

This is illustrated in method 400 of FIG. 6. In step 402 the coordinating software displays the status of the promotional feature on the host's screen. In step 404 the coordinating software checks whether the host has activated a "start flash" button. If so, then in step 406 the system timer is overridden and the flash sequence commences immediately. In step 408 the coordinating software checks whether the host has activated a "hold flash" button. This button permits the host to delay the start of the flash sequence. If the "hold flash" button has been activated then in step 410 the coordinating software overrides the current system timer.

In other arrangements the system provides the host with the option of manually specifying the winning colour.

The gaming system 200 records and stores statistics relating to the promotional feature, allowing users to examine the performance of the promotions and to compare their performance over time. Historical reports may be configured by users, for example during method 300, in order to suit the requirements of different gaming venues and to provide a range of possible data examination.

For example, comparative history reports may allow any session or sessions to be compared over time to the same sessions in previous periods. Single session reviews may provide 15 minute data capture and results may be shown as graphs or listings or displayed immediately on the system screens, printed to hard copy or exported to spreadsheet files.

While the foregoing description has been provided by way of example of certain embodiments of the present invention as presently contemplated, which utilize gaming machines of the type found in casinos, those skilled in the relevant arts will appreciate that the present invention also may have application to Internet gaming and/or have application to gaming over a telecommunications network, where handsets are used to display game outcomes and receive player inputs.

Where in the foregoing description reference has been made to integers having known equivalents, then those equivalents are hereby incorporated herein as if individually set forth.

Those skilled in the relevant arts will appreciate that modifications and additions to the embodiments of the present invention may be made without departing from the scope of the present invention.

It will be understood that the invention disclosed and defined in this specification extends to all alternative combinations of two or more of the individual features mentioned or evident from the text or drawings. All of these different combinations constitute various alternative aspects of the invention.

Any reference in this specification to the prior art does not constitute an admission that such prior art was well known or forms part of the common general knowledge in any jurisdiction.

It will also be understood that the term "comprises" (or its grammatical variants) as used in this specification is equivalent to the term "includes" and should not be taken as excluding the presence of other elements or features.

What is claimed is:

1. A gaming system operable to play a game, the gaming system comprising:

a plurality of gaming devices having a series of lights; and at least one server linked to the plurality of gaming devices comprising a controller having at least one processor and a memory storing a decay parameter and a plurality of instructions, which, when executed in a current round of the game, cause the at least one processor to at least:

control a plurality of participating gaming devices among the plurality of gaming devices to participate in the game to display a plurality of choices selected randomly based on a random outcome generated from a random number generator, receive, from the plurality of participating gaming devices, signals that indicate respective selections made from the plurality of choices to progress to a subsequent round of the game, control the plurality of participating gaming devices to initiate a flash sequence illuminating the series of lights at a rate that slows down based on the decay parameter responsive to receiving the signals, and eliminate a first participating gaming device from the game when the series of lights on the first participating gaming device is not illuminated in the flash sequence to indicate a first selection received from the first participating gaming device is different than a winning choice determined for the current round of the game for respective participating gaming devices to proceed to the subsequent round of the game.

2. The gaming system of claim 1, wherein the plurality of choices comprise a plurality of colors, wherein the winning choice comprises a winning color, and wherein the instructions, when executed, further cause the plurality of participating gaming devices to display the winning color when a termination criterion is met.

3. The gaming system of claim 1, wherein the plurality of choices comprise one or more parameters including player costs to purchase the plurality of choices and respective probabilities of winning for the plurality of choices.

4. The gaming system of claim 1, wherein the instructions, when executed, further cause the processor to terminate the game based on at least one of whether the current round of the game is a maximum number of rounds, whether an amount of time has elapsed following a commencement of the game, and whether there is only a single participating gaming device.

5. The gaming system of claim 1, wherein the instructions, when executed, further cause the processor to initiate the flash sequence after a predetermined amount time has elapsed following a start of the game.

6. The gaming system of claim 1, further comprising a system timer to determine a time to commence the game, and wherein the instructions, when executed, further cause the controller to, responsive to having determined that i) a commencement of the game has been activated, and ii) the system timer has been overridden to hold off the commencement of the game.

7. The gaming system of claim 1, wherein the plurality of choices comprise at least one of a color, a sound, and a movement.

8. A method of electronic gaming implemented by at least one processor in communication with at least one memory, the method comprising:

causing display at a plurality of participating gaming devices selected for a current round of a game from among a plurality of gaming devices a plurality of choices selected randomly based on a random outcome generated from a random number generator;

transmitting to the plurality of participating gaming devices a plurality of signals to initiate a flash sequence illuminating a series of lights at a rate that slows down based on a decay parameter; and causing the game to be terminated for a first participating gaming device when the series of lights on the first participating gaming device is not illuminated in the flash sequence to indicate a first selection made at the first participating gaming device is different than a winning choice determined for the current round of the game for respective participating gaming devices to proceed to a subsequent round of the game.

9. The method of claim 8, further comprising transmitting at least one message to the plurality of participating gaming devices to display the plurality of choices.

10. The method of claim 8, further comprising transmitting at least one message to the first participating gaming device to terminate the game at the first participating gaming device.

11. The method of claim 8, wherein the plurality of choices comprise one or more parameters including player costs to purchase the plurality of choices and respective probabilities of winning for the plurality of choices.

12. The method of claim 8, further comprising terminating the game based on at least one of whether the current round of the game is a maximum number of rounds, whether an amount of time has elapsed following a commencement of the game, and whether only one participating gaming device remains in the game.

13. The method of claim 8, further comprising initiating the flash sequence after a predetermined amount time has elapsed following a start of the game.

14. The method of claim 8, further comprising determining a time to commence the game based on i) a commencement of the game has been activated, and ii) overriding a system timer to hold off the commencement of the game.

15. A non-transitory computer-readable medium comprising a decay parameter and a plurality of instructions stored thereon, which, when executed by at least one processor, cause at least one processor to at least perform the steps of:

controlling one or more of a plurality of gaming devices to display for a current round of a game a plurality of choices selected based on a random outcome generated from a random number generator;

responsive to a plurality of selections having been made at the one or more of the plurality of gaming devices, initiating a flash sequence including illuminating a series of lights at a rate that slows down based on the decay parameter on the one or more of the plurality of gaming devices; and ending the game for a first gaming device when the series of lights on the first gaming device is not illuminated in the flash sequence to indicate a first selection received from the first gaming device is different than a winning choice determined for the current round of the game for respective gaming devices to proceed to a subsequent round of the game.

16. The non-transitory computer-readable medium of claim 15, wherein the plurality of choices comprise a plurality of colors, wherein the winning choice comprises a winning color, further comprising displaying the winning color when a termination criterion is met.

17. The non-transitory computer-readable medium of claim 15, wherein the plurality of choices comprise one or more parameters including player costs to purchase the plurality of choices and respective probabilities of winning for the plurality of choices.

18. The non-transitory computer-readable medium of claim 15, wherein the instructions, when executed, further cause the processor to perform the step of ending the game based on at least one of whether the current round of the game is a maximum number of rounds, whether an amount of time has elapsed following a commencement of the game, and whether there is only one participating gaming device.

19. The non-transitory computer-readable medium of claim 15, wherein the instructions, when executed, further cause the processor to perform the step of initiating the flash sequence after a predetermined amount time has elapsed following a start of the game.

20. The non-transitory computer-readable medium of claim 15, wherein the instructions, when executed, further cause the processor to perform the step of determining a time to commence the game based on i) a commencement of the game has been activated, and ii) overriding a system timer to hold off the commencement of the game.

* * * * *